United States Patent
Jung et al.

(10) Patent No.: US 11,720,405 B2
(45) Date of Patent: Aug. 8, 2023

(54) ACCELERATOR, METHOD OF OPERATING THE SAME, AND ELECTRONIC DEVICE INCLUDING THE SAME

(71) Applicants: Samsung Electronics Co., Ltd., Suwon-si (KR); Seoul National University R&DB Foundation, Seoul (KR)

(72) Inventors: Wookeun Jung, Seoul (KR); Jaejin Lee, Seoul (KR); Seung Wook Lee, Suwon-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 17/145,958

(22) Filed: Jan. 11, 2021

(65) Prior Publication Data
US 2021/0397481 A1    Dec. 23, 2021

(30) Foreign Application Priority Data
Jun. 22, 2020    (KR) ........................ 10-2020-0075682

(51) Int. Cl.
| | |
|---|---|
| G06F 9/38 | (2018.01) |
| G06N 3/063 | (2023.01) |
| G06F 9/50 | (2006.01) |
| G06F 9/48 | (2006.01) |
| G06F 9/30 | (2018.01) |

(52) U.S. Cl.
CPC ........ G06F 9/5027 (2013.01); G06F 9/30014 (2013.01); G06F 9/3802 (2013.01); G06F 9/3836 (2013.01); G06F 9/48 (2013.01); G06N 3/063 (2013.01)

(58) Field of Classification Search
CPC ............................ G06F 9/3802; G06F 9/5027
See application file for complete search history.

(56) References Cited

U.S. PATENT DOCUMENTS

| | | | |
|---|---|---|---|
| 9,558,094 | B2 | 1/2017 | Zhou |
| 9,972,063 | B2 | 5/2018 | Ashari et al. |
| 10,157,045 | B2 | 12/2018 | Venkataramani et al. |
| 10,223,762 | B2 | 3/2019 | Ashari et al. |
| 2017/0032487 | A1 | 2/2017 | Ashari et al. |
| 2018/0136912 | A1 | 5/2018 | Venkataramani et al. |
| 2018/0189633 | A1* | 7/2018 | Henry ................. G06N 3/0445 |
| 2019/0220278 | A1* | 7/2019 | Adelman ............ G06F 9/30036 |
| 2020/0257986 | A1* | 8/2020 | Diamantopoulos ...... G06N 3/04 |
| 2020/0295778 | A1* | 9/2020 | Ramesh ............. H03M 7/3084 |
| 2020/0304293 | A1* | 9/2020 | Gama ..................... G06F 17/16 |

FOREIGN PATENT DOCUMENTS

| | | |
|---|---|---|
| JP | 6635265 B2 | 1/2020 |
| KR | 10-2019-0085444 A | 7/2019 |
| KR | 10-2019-0088643 A | 7/2019 |

* cited by examiner

Primary Examiner — Michael J Metzger
(74) Attorney, Agent, or Firm — NSIP Law (57) ABSTRACT

A processor-implemented accelerator method includes: reading, from a memory, an instruction to be executed in an accelerator; reading, from the memory, input data based on the instruction; and performing, on the input data and a parameter value included in the instruction, an inference task corresponding to the instruction.

22 Claims, 11 Drawing Sheets

ACCELERATOR, METHOD OF OPERATING THE SAME, AND ELECTRONIC DEVICE INCLUDING THE SAME

CROSS-REFERENCE TO RELATED APPLICATIONS

This application claims the benefit under 35 USC § 119(a) of Korean Patent Application No. 10-2020-0075682 filed on Jun. 22, 2020, in the Korean Intellectual Property Office, the entire disclosure of which is incorporated herein by reference for all purposes.

BACKGROUND

1. Field

The following description relates to an accelerator, a method of operating the accelerator, and an electronic device including the accelerator.

2. Description of Related Art

There may be a desire for independent hardware solely for artificial intelligence (AI). AI may perform inference and learning through an operation. Thus, a device that is hardware dedicated to the implementation of AI may be desired.

Such dedicated hardware for AI may be embodied by, for example, a central processing unit (CPU) and a graphics processing unit (GPU), or by a field-programmable gate array (FPGA) and an application-specific integrated circuit (ASIC) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented accelerator method includes: reading, from a memory, an instruction to be executed in an accelerator; reading, from the memory, input data based on the instruction; and performing, on the input data and a parameter value included in the instruction, an inference task corresponding to the instruction.

The instruction may be determined by substituting, with the parameter value, an indicator of the parameter value included in an initial code.

The indicator included in the initial code may use a loop variable index, and the loop variable index may be converted to an invariable index through loop unrolling.

The parameter value may be a value fixed for the inference task.

The instruction may be determined such that a same parameter value is used in a thread block including a plurality of threads to be processed in the accelerator.

An operation unit included in the accelerator and having an instruction cache may be configured to process the thread block.

The reading of the instruction from the memory may include: reading, from the memory, a plurality of instructions each including a partial value of the parameter value to be used in the inference task, wherein a maximum length of the partial value of the parameter value included in each of the plurality of instructions is less than a preset threshold value, wherein the parameter value is determined based on each of the partial values respectively included in a corresponding one of the plurality of instructions.

Each of the plurality of instructions may include information indicating which part of the parameter value corresponds to the partial value of the parameter value included in the respective instruction.

The plurality of instructions may include a first instruction including a mantissa part of the parameter value and a second instruction including an exponent part of the parameter value, and the performing of the inference task may include performing a multiplication operation on the mantissa part in response to the first instruction being read, and performing an addition operation on the exponent part in response to the second instruction being read.

A maximum length of a parameter value portion of an instruction of the memory may be less than a length of the parameter value, the memory may be configured to store the parameter value as a plurality of parameter value portions, each of the parameter value portions being included in a respective instruction, the reading of the instruction from the memory may include reading the respective instructions, and the parameter value may be determined based on the parameter value portions.

The parameter value may be a parameter included in a neural network, and the method may include performing any one of speech recognition, machine translation, machine interpretation, object recognition, and pattern recognition based on a result of the performing of the inference task.

A non-transitory computer-readable storage medium may store instructions that, when executed by a processor, configure the processor to perform the method.

In another general aspect, an accelerator may include: at least one processing element configured to: read, from a memory, an instruction to be executed in an accelerator; read, from the memory, input data based on the instruction; and perform, on the input data and a parameter value included in the instruction, an inference task corresponding to the instruction.

The instruction may be determined by substituting, with the parameter value, an indicator of the parameter value included in an initial code.

The indicator included in the initial code may use a loop variable index, and the loop variable index may be converted to an invariable index through loop unrolling.

The parameter value may be a value fixed for the inference task.

The instruction may be determined such that a same parameter value is used in a thread block including a plurality of threads to be processed in the accelerator.

An operation unit included in the accelerator and having an instruction cache may be configured to process the thread block.

For the reading of the instruction from the memory, the processing unit may be configured to: read, from the memory, a plurality of instructions each including a partial value of the parameter value, wherein a maximum length of the partial value of the parameter value included in each of the plurality of instructions is less than a preset threshold value, wherein the parameter value is determined based on each of the partial values respectively included in a corresponding one of the plurality of instructions.

Each of the plurality of instruction may include information indicating which part of the parameter value corresponds to the partial value included in the respective instruction.

An electronic device may include the memory and the accelerator.

In another general aspect, an electronic device includes: a memory configured to store an instruction to be executed in an accelerator and input data; and the accelerator configured to read the instruction from the memory, read the input data from the memory based on the instruction, and perform, on the input data and a parameter value included in the instruction, an inference task associated with the instruction.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Figure 1:
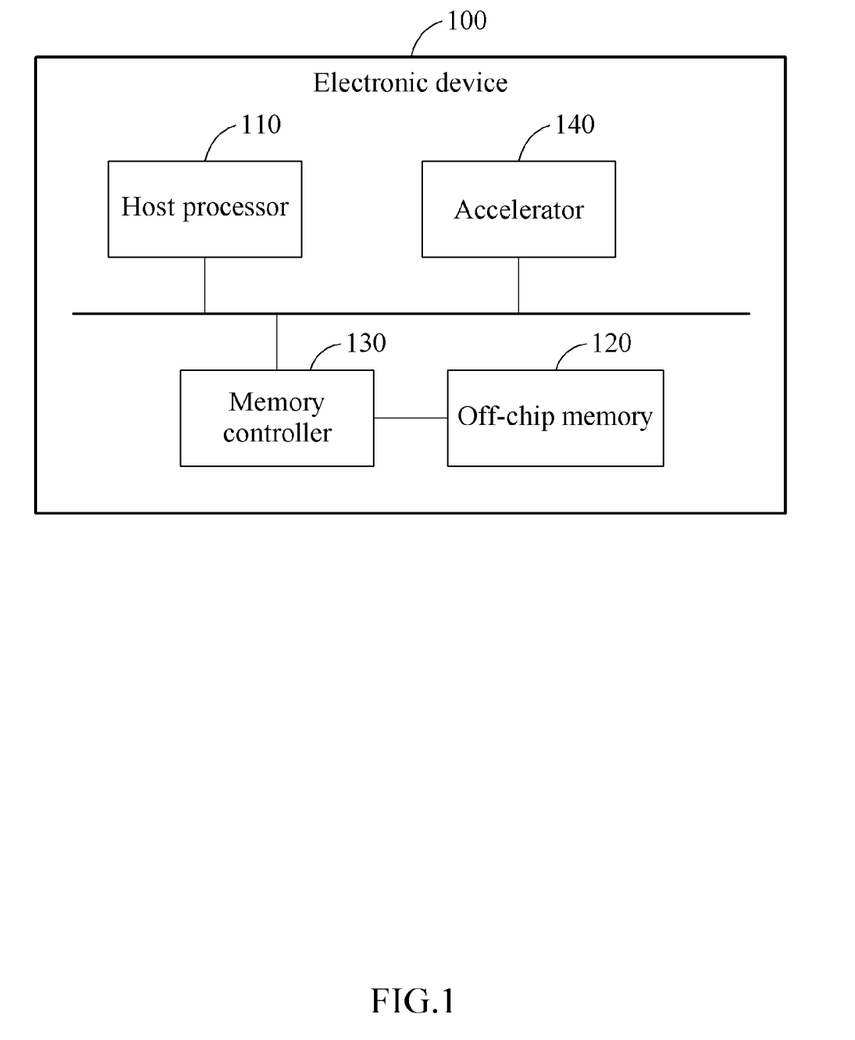
FIG. 1 illustrates an example of an electronic device.

FIG. 1 illustrates an example of an electronic device.

Referring to FIG. 1, an electronic device 100 may include a host processor 110, an off-chip memory 120, a memory controller 130, and an accelerator 140. The host processor 110, the off-chip memory 120, the memory controller 130, and the accelerator 140 may communicate with one another through a bus.

The host processor 110 may be a device configured to control respective operations of components included in the electronic device 100 and may include a central processing unit (CPU), for example. The host processor 110 may receive a request for processing a neural network-based inference task in the accelerator 140, and transmit an instruction to the accelerator 140 in response to receiving the request. The request may be made for neural network-based data inference, and for obtaining a result of the data inference by allowing the accelerator 140 to execute a neural network for speech recognition, machine translation, machine interpretation, object recognition, pattern recognition, computer vision, or the like.

The off-chip memory 120 may be a memory disposed outside the accelerator 140, and be a dynamic random-access memory (DRAM) used as a main memory of the electronic device 100. The off-chip memory 120 may be accessible through the memory controller 130. The off-chip memory 120 may store at least one of an instruction to be executed in the accelerator 140, parameters of the neural network, or input data to be inferred, and be used in a case in which an on-chip memory inside the accelerator 140 is not sufficient (e.g., in memory capacity) to execute the neural network in the accelerator 140.

The off-chip memory 120 may have a larger memory capacity than the on-chip memory in the accelerator 140. However, when executing the neural network, a memory access cost for access by the accelerator 140 to the off-chip memory 120 may be greater than a memory access cost for access to the on-chip memory. Such memory access cost may indicate an amount of power and/or processing time used for accessing a memory and then reading or writing data from or in the memory.

The accelerator 140 may be an artificial intelligence (AI) accelerator configured to execute the neural network according to the instruction of the host processor 110 and infer data to be input, and be a separate processor distinguished from the host processor 110. The accelerator 140 may be embodied as a neural processing unit (NPU) (or neural processor), a graphics processing unit (GPU), a tensor processing unit (TPU), a CPU, or the like.

The accelerator 140 may be a separate exclusive processor that processes a task or workload more effectively than the host processor 110 used for general purposes, based on the characteristics of operations of the neural network. Here, one or more processing elements (PEs) included in the accelerator 140, and the on-chip memory may be used to process the task or workload. A PE may be a device configured to perform an operation or computation of the neural network, and may include an operation unit (for example, a streaming multiprocessor (SM), a floating-point unit (FPU), or the like). The on-chip memory may be a device including a global shared buffer and a local buffer that are included in the accelerator 140, and be distinguished from the off-chip memory 120 disposed outside the accelerator 140. The on-chip memory may include, for example, a scratchpad memory accessible through an address space, a static random-access memory (SRAM), a system cache, or the like.

The neural network may include a plurality of layers. In an example, the neural network may include an input layer, a plurality of hidden layers, and an output layer. Each of the layers may include a plurality of nodes each referred to as an artificial neuron. While the nodes may be referred to as "artificial neurons," such reference is not intended to impart any relatedness with respect to how the neural network architecture computationally maps or thereby intuitively recognizes information and how a human's neurons operate. I.e., the term "artificial neurons" is merely a term of art referring to the hardware implemented nodes of the neural network. Each of the nodes may indicate a computation unit having at least one input and output, and the nodes may be connected to one another. A weight may be set for a connection between nodes, and be adjusted or changed. The weight may be a parameter that determines the influence of a related data value on a final result by increasing, decreasing, or maintaining the data value. To each node included in the output layer, weighted inputs of nodes included in a previous layer may be input. A process in which weighted data is input from a layer to a subsequent layer of the layer may be referred to as propagation.

An inference task of the neural network may be a task of analyzing a characteristic of input data by executing or performing operations of the neural network using the input data and a parameter of the neural network. Such an inference task of the neural network may be used to analyze large data, and numerous operations may be performed based on varying input data and a fixed parameter value. Using such a characteristic of an operation of the neural network, the electronic device 100 of one or more embodiments may improve the performance of the electronic device 100.

Hereinafter, example embodiments will be described in detail with reference to the accompanying drawings.

Figure 2:
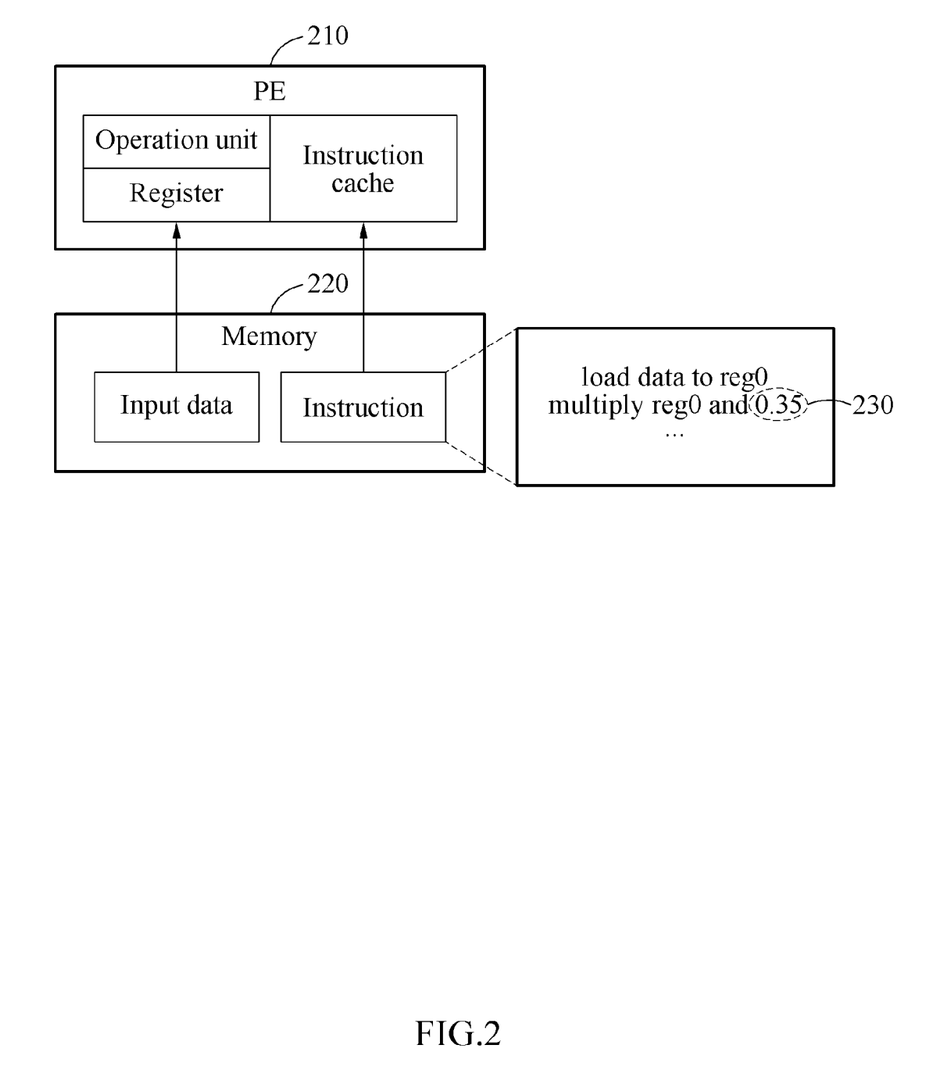
FIG. 2 illustrates an example of an operation of an accelerator.

FIG. 2 illustrates an example of an operation of an accelerator (e.g., the accelerator 140).

Referring to FIG. 2, an operation or computation may be performed in a PE 210 included in the accelerator based on input data and an instruction that are stored in a memory 220. The memory 220 may be an off-chip memory (e.g., the off-chip memory 120) disposed outside the accelerator.

The PE 210 may include an operation unit, an instruction cache, and a register. The instruction cache and the register may be an on-chip memory configured to respectively store an instruction and input data for an operation to be performed in the operation unit.

The PE 210 may read an instruction stored in the memory 220 and store the read instruction in the instruction cache. The PE 210 may then execute the stored instruction. According to the instruction, the PE 210 may load input data from the memory 220 and store the input data in the register, for example, reg0. The PE 210 then performs a multiplication operation on the input data stored in reg0 and a parameter value 230 (e.g., 0.35, though the parameter value 230 may be another value in another example), based on the operation unit. The parameter value 230 may be an invariable, or a constant, corresponding to one of parameters included in a neural network.

In a typical accelerator, the parameter value 230 may be stored in the memory 220 (not in the instruction) and the instruction may include an indicator of the parameter value 230, and thus, in order to perform an operation using the parameter value 230, the PE 210 of the typical accelerator may access the memory 220 for loading the input data and then access again the memory 220 for loading the parameter value 230. Such an increase in access to the memory 220 which is disposed outside the PE 210 may result in an increase in operation overhead of the typical accelerator, and such an access may thus be minimized by the accelerator of one or more embodiments.

When the parameter value 230 is an unvarying value, which is an invariable, according to the characteristic of an inference task as described above, the accelerator of one or more embodiments may prevent the increase in the operation overhead by embedding the parameter value 230 in the instruction. That is, by embedding the parameter value 230 in the instruction, loading the parameter value 230 from the memory 220 may become unnecessary to perform the operation, and thus the accelerator of one or more embodiments may increase the performance of the PE 210 by as much as the overhead.

Figure 3:
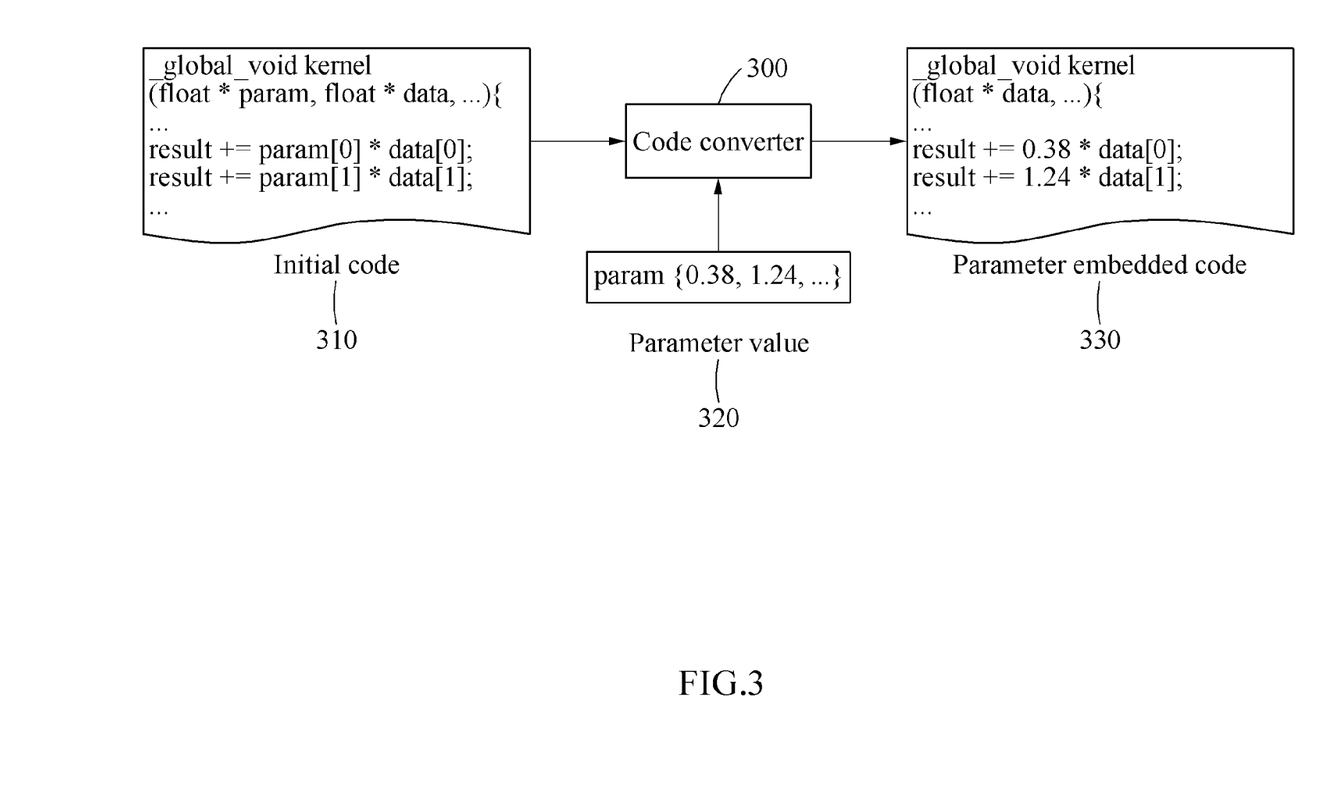
FIG. 3 illustrates an example of a code converter.

FIG. 3 illustrates an example of a code converter.

Referring to FIG. 3, a code converter 300 may convert an initial code 310 to a parameter embedded code 330. The initial code 310 may be an inference code including a parameter value indicator (for example, an input GPU kernel code). In the example of FIG. 3, the indicator may be, for example, param[0] and param[1]. The code converter 300 may determine whether the initial code 310 includes a parameter value indicator. When the initial code 310 includes the parameter value indicator, the code converter 300 may read a memory area to which the indicator refers and verify a parameter value 320. For example, the parameter value 320 may be included in parameter information. The parameter information may include a global memory pointer symbol that transfers a parameter value, and a parameter value to be used in actual inference, among kernel function factors of the input GPU kernel code. Subsequently, the code converter 300 may substitute the indicator included in the initial code 310 with the corresponding parameter value 320, and output the parameter embedded code 330 as a result of the substitution. In the example of FIG. 3, indicators param[0] and param[1] are substituted with 0.38 and 1.24, respectively, to be included in the parameter embedded code 330. In an example, the code converter 300 may be included in the electronic device 100 (e.g., such as in the host processor 110).

Figure 4:
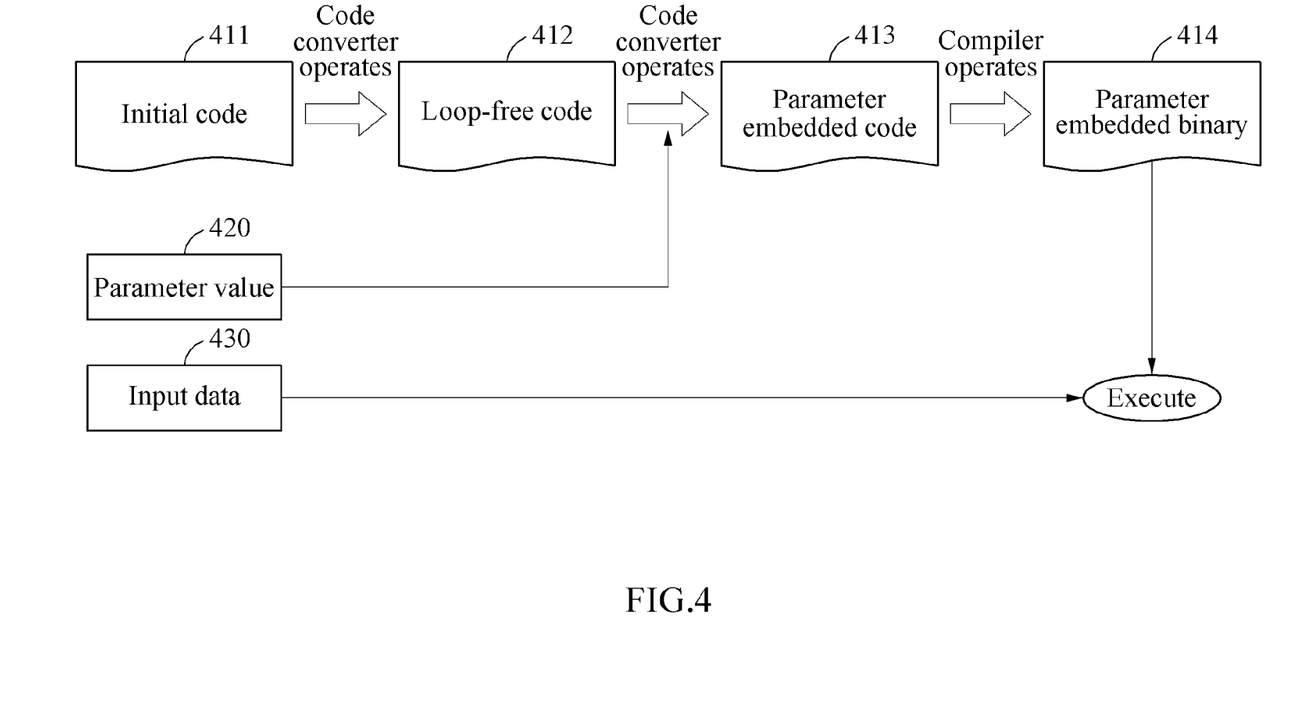
FIGS. 4 and 5 illustrate examples of converting a code and executing a code obtained through the converting in an accelerator.
Figure 5:
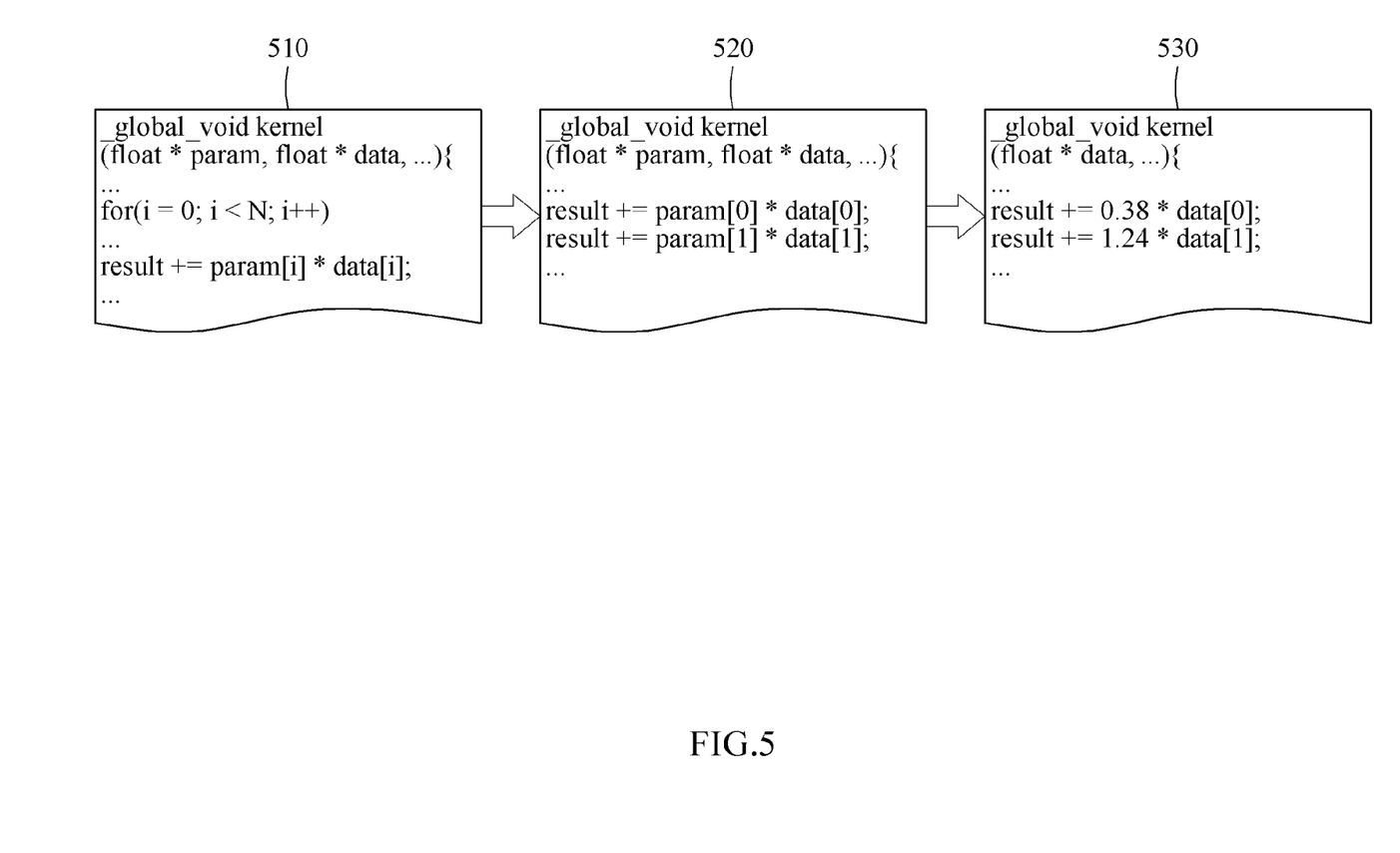

FIGS. 4 and 5 illustrate examples of converting a code and executing the converted code in an accelerator (e.g., the accelerator 140).

Referring to FIGS. 4 and 5, an initial code 411 may be converted to a parameter embedded code 413 through a loop-free code 412.

In an example, the initial code 411 may be a source code including a parameter value indicator, and may indicate a case where the indicator is written based on a loop variable index. Referring to FIG. 5, an initial code 510 (e.g., an example of the initial code 411) may use a loop variable index i of which a value of an indicator param[i] present in a 'for' loop increases as the loop proceeds.

A code converter (e.g., the code converter 300) may determine the loop-free code 412 by converting the loop variable index included in the initial code 411 to an invariable index through loop unrolling. Referring to FIG. 5, in a loop-free code 520 (e.g., an example of the loop-free code 412), the 'for' loop may disappear and the loop variable index i may be converted to an invariable index 0 to N, and parameter value indicators may be arranged as illustrated.

The code converter may determine the parameter embedded code 413 by substituting an indicator of a parameter value included in the loop-free code 412 with the parameter value. Referring to FIG. 5, in a parameter embedded code 530 (e.g., an example of the parameter embedded code 413), parameter value indicators, for example, param[0], param[1], . . . , may be converted to a parameter value 420, for example, 0.38, 1.24, . . . , respectively.

Subsequently, a compiler may generate a parameter embedded binary 414 by compiling the parameter embedded code 413. The parameter embedded binary 414 may correspond to an instruction to be executed in an accelerator. In an example, the compiler may be included in the electronic device 100 (e.g., such as in the host processor 110).

The accelerator may load the parameter embedded binary 414 to execute it. After loading input data 430 based on the parameter embedded binary 414, the accelerator may perform an operation with the parameter value included in the parameter embedded binary 414.

Figure 6:
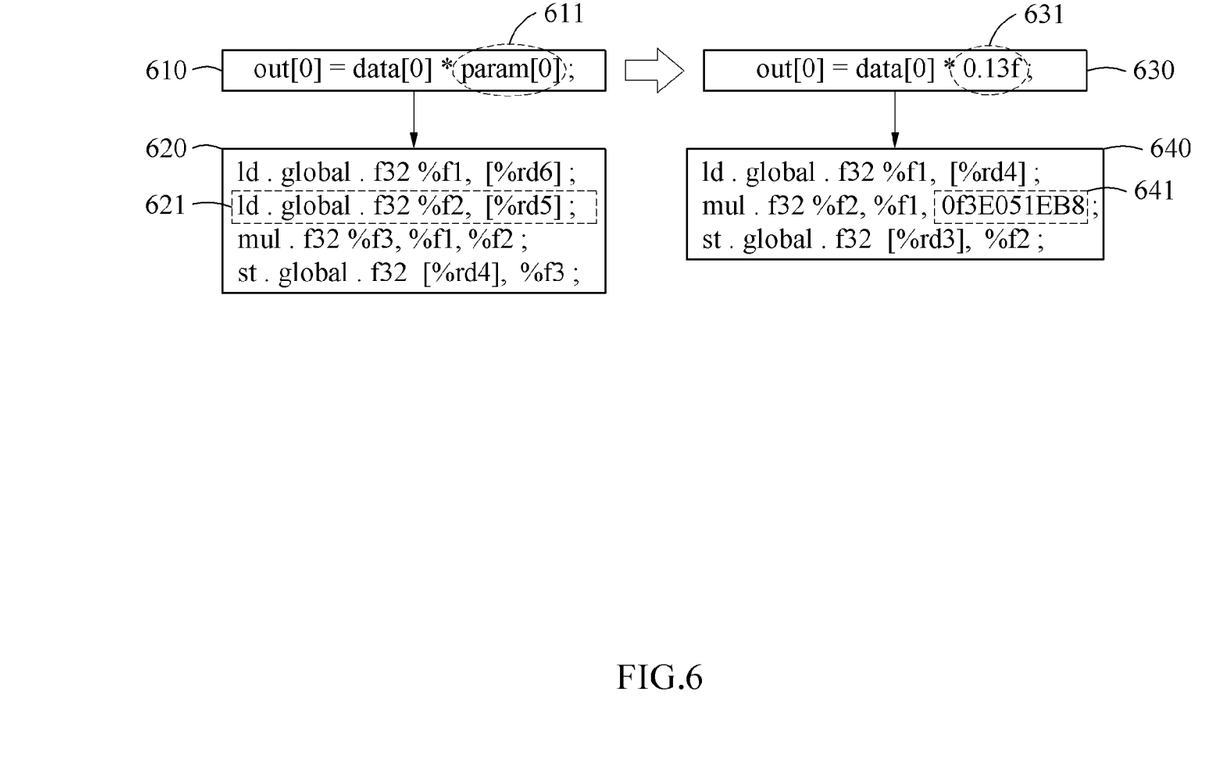
FIG. 6 illustrates an example of an instruction obtained by converting a code.

FIG. 6 illustrates an example of an instruction obtained by converting a code.

In the example of FIG. 6, illustrated are an initial code 610, an initial binary 620, a parameter embedded code 630, and a parameter embedded binary 640. For the convenience of description, the initial code 610 and the parameter embedded code 630 may be written in a compute unified device architecture (CUDA), and the initial binary 620 and the parameter embedded binary 640 may be written in a parallel thread execution (PTX) code of a GPU, for example, an assembly code abstracting a GPU instruction. In addition to the foregoing example methods, various code methods may be applied without a limitation.

The initial code 610 may be a code including an indicator 611 of a parameter value. The initial binary 620 obtained by compiling the initial code 610 may include a load instruction 621 that reads a parameter from a memory.

The parameter embedded code 630 may be a code obtained by substituting the indicator 611 included in the initial code 610 with a parameter value 631. The parameter embedded binary 640 obtained by compiling the parameter embedded code 630 may not include the load instruction 621 of the initial binary 620, but may immediately include a parameter value 641 in an instruction.

Figure 7:
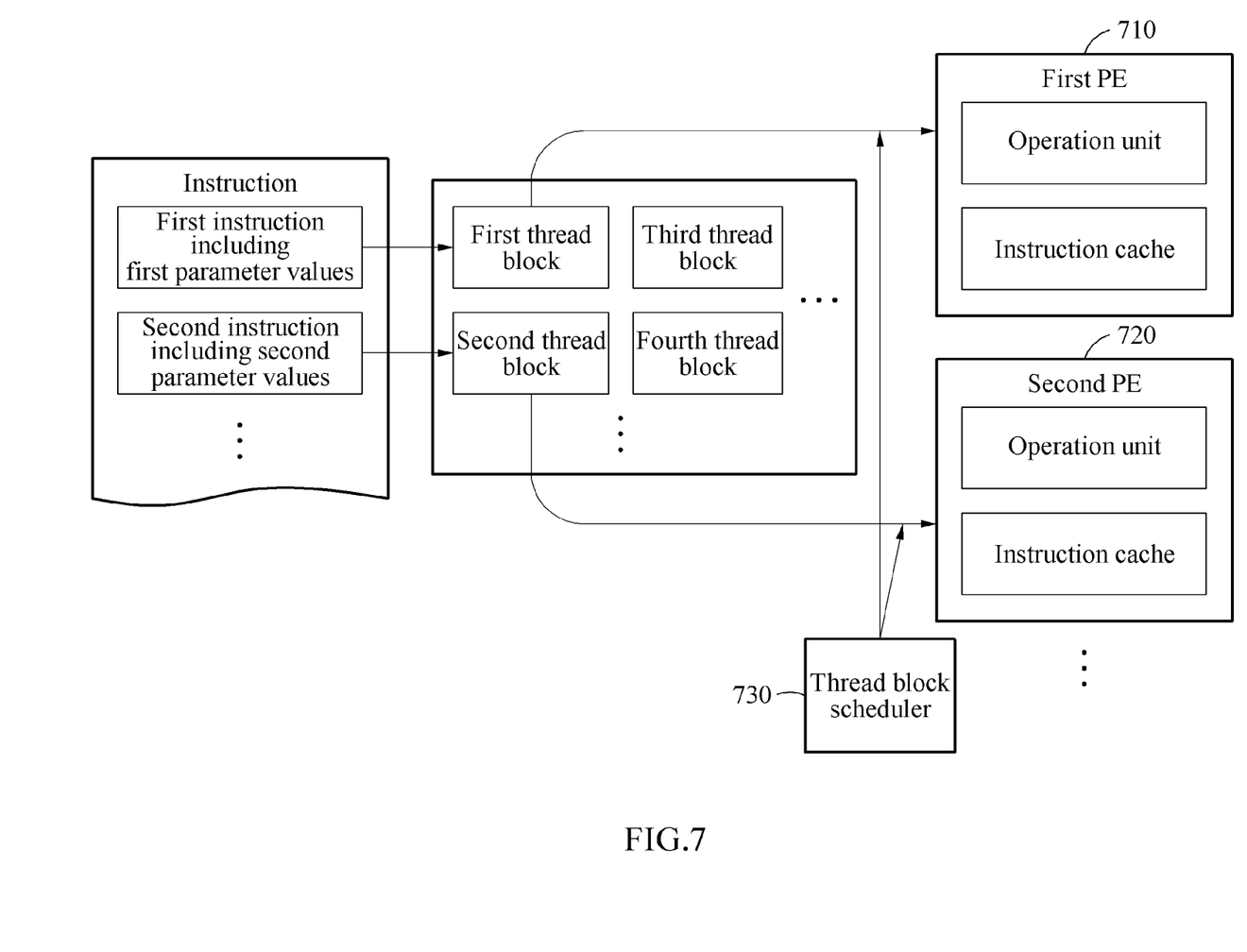
FIG. 7 illustrates an example of optimizing an instruction including a parameter value for execution in an accelerator.

FIG. 7 illustrates an example of optimizing an instruction including a parameter value for execution in an accelerator (e.g., the accelerator 140).

FIG. 7 illustrates an example of a method of optimizing a parameter embedded code based on an architecture of the accelerator. The accelerator may be a GPU-based processor.

In an example, as the number of channels to be applied to a neural network increases, the number of parameter values to be embedded in an instruction may increase, and a size of an instruction cache included in the accelerator may become insufficient to process the number of parameter values, and thus the reusability of the cache may be degraded. However, this degraded reusability may be effectively prevented through an optimization method of one or more embodiments based on a GPU architecture.

A GPU-based program may include numerous GPU threads, and a plurality of GPU threads may form a single warp. A plurality of warps may form a single thread block. Here, the GPU threads included in the warp may execute the same instruction all the time. When executing the instruction, the threads may be assigned to a PE in a thread block unit and then be executed therein. Here, scheduling may be performed by a thread block scheduler 730 embodied by GPU hardware, and may not be controlled by a user.

For example, when the optimization method of one or more embodiments assigns warps that use the same parameter to a same PE, the same instruction may be executed according to a characteristic of a parameter embedded code, and thus the reusability of the instruction may increase and overall system performance may also be improved. However, since a user may not control a warp to be assigned to a PE, it may be programmed to use the same parameter for each thread block unit that is guaranteed to be assigned to the same PE in a programming model.

Here, by adjusting an occupancy of a thread block such that only one thread block is activated simultaneously in a PE at a time, the optimization method of one or more embodiments may prevent the corruption of an instruction cache. By maximally increasing the number of threads included in a thread block, it is possible to maximally increase the reusability of an instruction.

Thus, by allowing PEs, for example, SMs, having an additional instruction cache in a GPU, to use different parameter values, the optimization method of one or more embodiments may maximally increase the reusability of the instruction cache and optimize the accelerator execution of an instruction including a parameter value. In the example of FIG. 7, a first instruction having first parameter values and a second instruction having second parameter values may use different parameter values. The first instruction may be included in a first thread block and be assigned to a first PE 710, and the second instruction may be included in a second thread block and be assigned to a second PE 720. Thus, the first PE 710 and the second PE 720 may use the different parameter values, and process only one thread block, respectively. Thus, the optimization method of one or more embodiments may effectively increase the instruction reusability.

Figure 8:
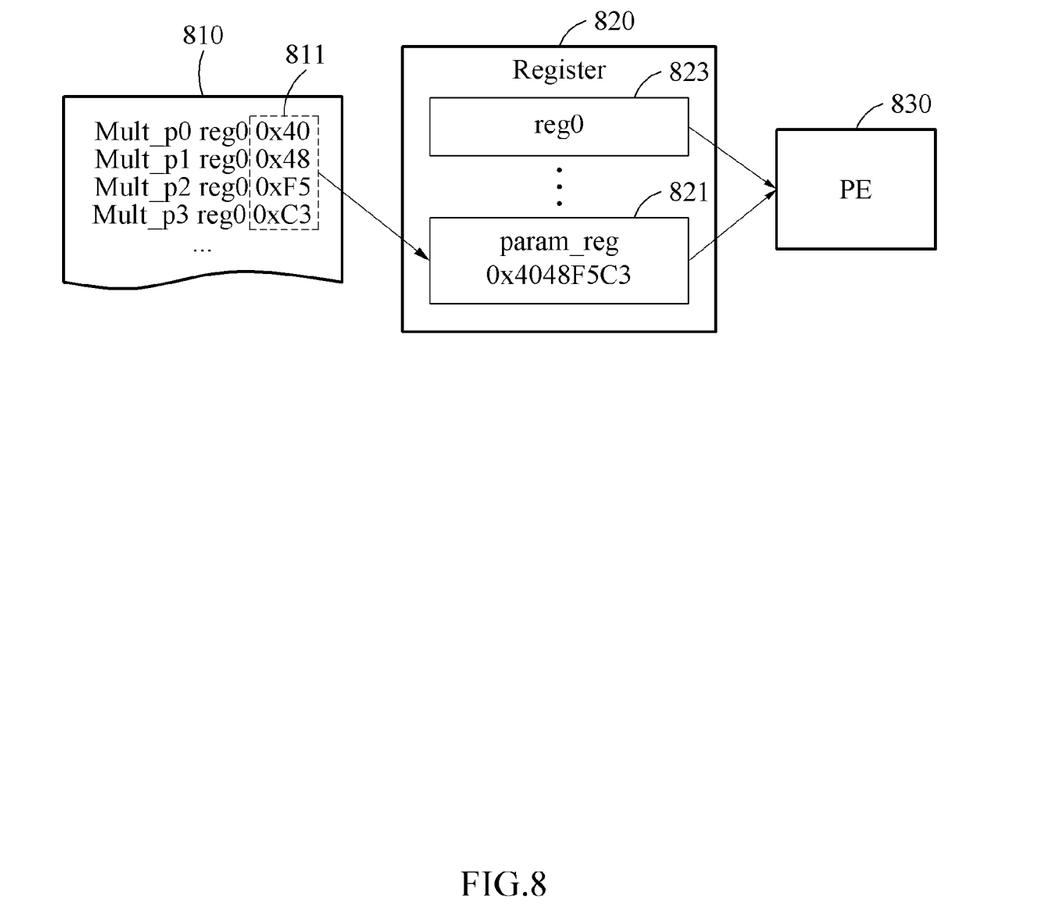
FIG. 8 illustrates an example of determining a parameter value based on a plurality of instructions.

FIG. 8 illustrates an example of determining a parameter value based on a plurality of instructions.

Referring to FIG. 8, when a maximum length of a parameter value to be included in an instruction is less than a preset threshold value, a portion of the parameter value may be included in each of a plurality of instructions. In an example, in a case of a GPU architecture, a 128-bit instruction set may be used and a 32-bit invariable may be embedded in an instruction, and thus a parameter value (e.g., a 32-bit floating-point value) that is mainly used in a deep learning model may be embedded in a binary system. In a case of a CPU, or a mobile CPU in particular, a 32-bit instruction set may be used, and thus only an 8-bit or 16-bit invariable may be included in a single instruction according to an instruction set architecture (ISA). In such a case, through an ISA expansion, a single parameter value may be included in a plurality of instructions.

In the example of FIG. 8, an 8-bit portion of a parameter value which is a 32-bit invariable may be embedded in each of four instructions 810 as illustrated by reference numeral 811. Each of the instructions 810 may include information indicating which part (e.g., 0:7, 8:15, 16:23, and 24:31 bit from most significant bit [MSB]) of the 32-bit parameter value corresponds to an 8-bit value included in each instruction.

A register 820 may include a special register param_reg 821 of which an architecture may be adjusted such that an invariable value obtained partially from each of the instructions 810 is stored at a suitable bit position of the register 820. For example, while the four instructions 810 are executed, the parameter value may be read by 8 bits each and stored in the special register param_reg 821. When a last instruction Mult_p3 is executed and the entire parameter value is included in the special register param_reg 821, the parameter value may be transferred to a PE 830, for example, a floating-point unit, and then an operation with input data stored in a register reg0 823 may be performed.

In another example, by forming an ISA based on the format of a floating-point expression and implementing the available PE 830, without waiting until the entire parameter value included in the four instructions 810 is stored in the special register param_reg 821, the operation may be performed first even when only a partial bit of the parameter value is stored. For example, when there is an instruction including a bit of a mantissa part of a floating point and an instruction including a bit of an exponent part of the floating point, the PE 830 may perform a multiplication operation on the mantissa part when performing an operation associated with the former instruction and perform an addition operation on the exponent part when performing an operation associated with the latter instruction. Through this, the determining of the parameter value according to one or more embodiments may reduce an unnecessary overhead and improve the performance of an accelerator.

Figure 9:
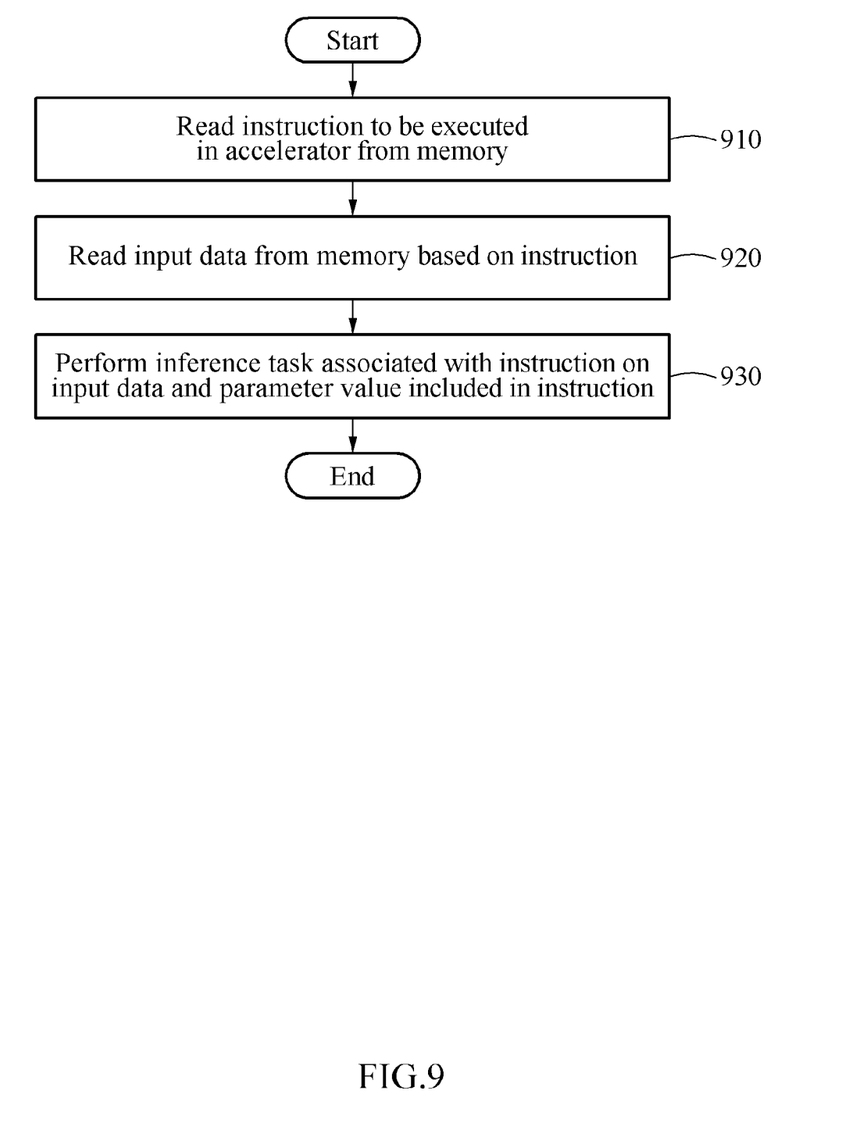
FIG. 9 illustrates an example of a method of operating an accelerator.

FIG. 9 illustrates an example of a method of operating an accelerator.

Hereinafter, an operation method of an accelerator will be described with reference to FIG. 9.

Referring to FIG. 9, in operation 910, the accelerator reads, from a memory, an instruction to be executed in the accelerator. The instruction may be determined by substituting an indicator of a parameter value included in an initial code with the parameter value. When the indicator included in the initial code uses a loop variable index, the loop variable index may be converted to an invariable index through loop unrolling.

In an example, the instruction may be determined such that the same parameter value is used in a thread block including a plurality of threads to be processed in the accelerator. An operation unit included in the accelerator and having an instruction cache may process a single thread block.

In addition, when a maximum length of a parameter value to be included in an instruction is less than a preset threshold value, a plurality of instructions each including a part of the parameter value to be used for an inference task may be read from the memory. The parameter value may be determined based on a partial value included in each of the plurality of instructions. Each of the plurality of instructions may include information indicating which part of the parameter value corresponds to a partial value of the parameter value included in each of the plurality of instructions. The plurality of instructions may include a first instruction including a mantissa part of the parameter value, and a second instruction including an exponent part of the parameter value. When the first instruction is read, the accelerator may perform a multiplication operation on the mantissa part. When the second instruction is read, the accelerator may perform an addition operation on the exponent part of the parameter value.

In operation 920, the accelerator reads input data from the memory based on the instruction.

In operation 930, the accelerator performs, on the input data and the parameter value included in the instruction, an inference task associated with the instruction. The parameter value may be a value fixed for the inference task.

In an example, the method described above may be applied to a deep learning inference task using an electronic device, and be embodied in the form of a deep learning inference library for a mobile device or applied to improve and expand an ISA of a processor. In addition, by inputting a parameter value immediately to an immediate value field in an instruction without loading a fixed parameter value into a register, it is possible to reduce an overhead in a subsequent instruction decoding process.

For a more detailed description of the operations described above with reference to FIG. 9, reference may be made to what has been described above with reference to FIGS. 1 through 8, and thus a more detailed and repeated description will be omitted here for brevity.

Figure 10:
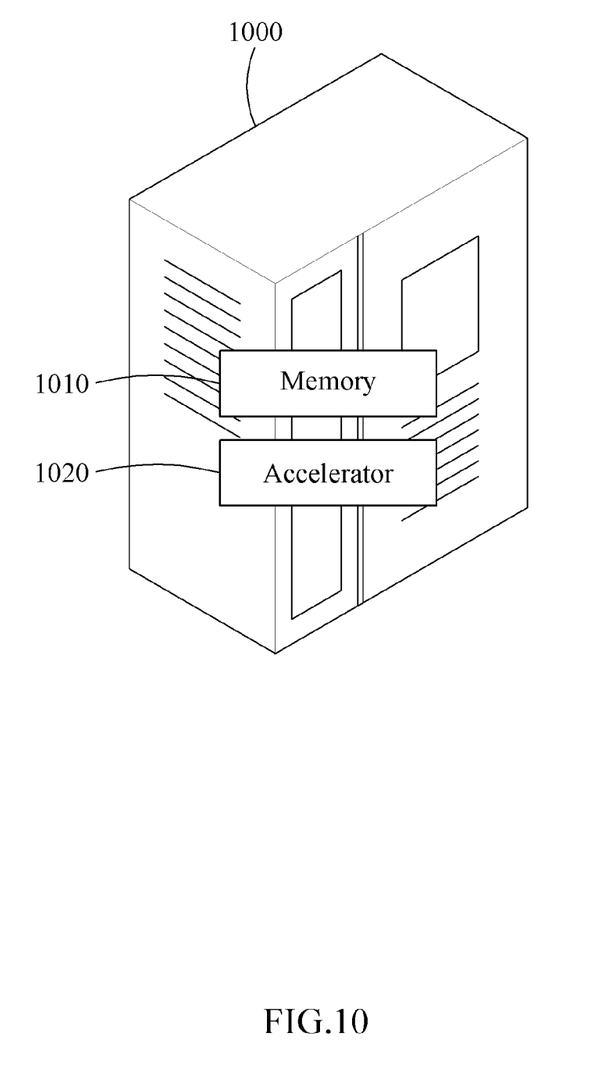
FIGS. 10 and 11 illustrate examples of an electronic device.
Figure 11:
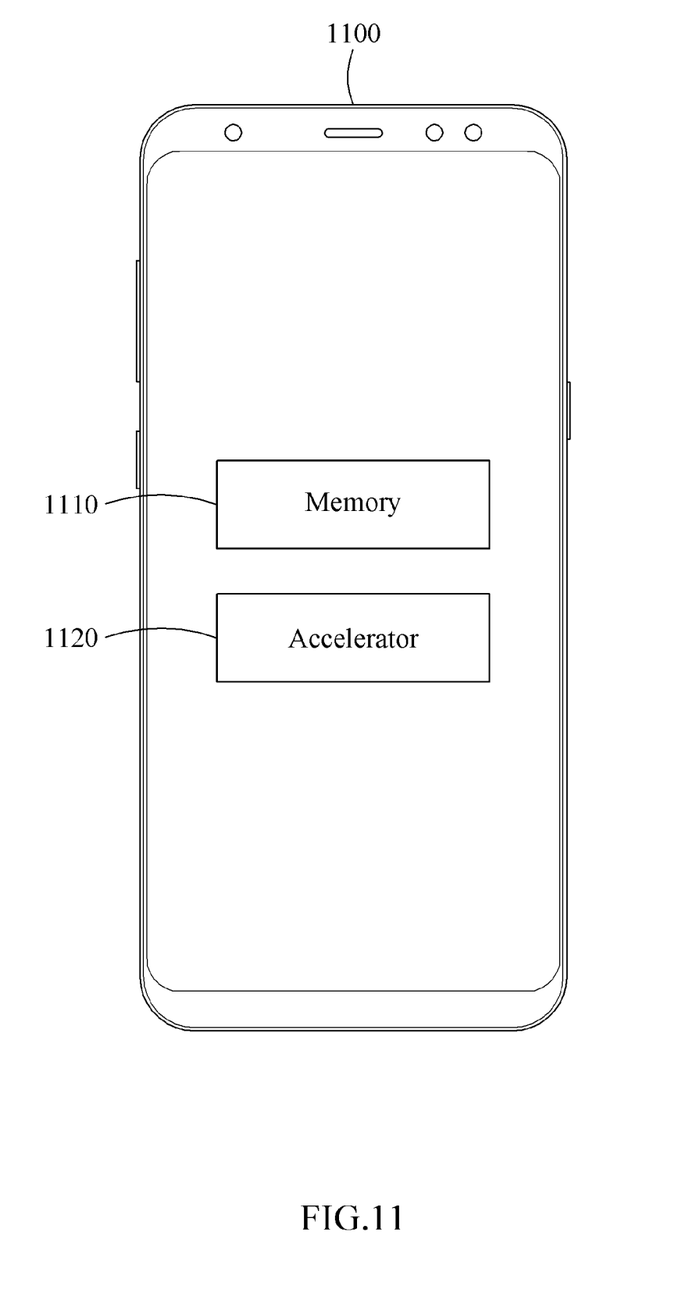

FIGS. 10 and 11 illustrate examples of an electronic device (e.g., the electronic device 100).

Referring to FIG. 10, in an example, the electronic device may be embodied as a server 1000. The server 1000 may refer to a separate device distinguished from a user terminal controlled by a user, and may communicate with one or more user terminals through a wired and/or wireless network. The server 1000 may receive requests that are simultaneously transmitted from multiple users through their user terminals. To perform an inference task in response to a request, an accelerator 1020 may read an instruction stored in a memory 1010, read input data from the memory 1010 based on the instruction, and perform the inference task on the input data and a parameter value included in the instruction. The server 1000 may return an inference result generated through the inference task to a user terminal. The user terminal described herein may include, for example, a computing device such as a smartphone, a personal computer (PC), a tablet PC, and a laptop, a wearable device such as a smart watch and smart eyeglasses, a home appliance such as a smart speaker, a smart TV, and a smart refrigerator, and other devices such as a smart vehicle, a smart kiosk, and an Internet of things (loT) device.

Referring to FIG. 11, in an example, the electronic device may be embodied as a user terminal 1100. Although the user terminal 1100 is illustrated as a smartphone in FIG. 11 for the convenience of description, any device that is controlled by a user may be applicable without limitation. The user terminal 1100 may obtain a request directly from a user, and an accelerator 1120 may perform an inference task in response to the request by performing an instruction stored in a memory 1110.

The accelerators, the electronic devices, host processors, off-chip memories, memory controllers, memories, code converters, PEs, first PEs, second PEs, thread block schedulers, registers, special registers, servers, user terminals, electronic device 100, host processor 110, off-chip memory 120, memory controller 130, accelerator 140, a PE 210, memory 220, a code converter 300, first PE 710, second PE 720, thread block scheduler 730, register 820, special register param_reg 821, register reg0 823, PE 830, server 1000, memory 1010, accelerator 1020, user terminal 1100, memory 1110, accelerator 1120, and other apparatuses, units, modules, devices, and other components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented accelerator method, the method comprising:
   reading, from a memory, an instruction to be executed in an accelerator, the instruction embedding a parameter value of at least some portion of layers in a neural network for an inference task;
   reading, from the memory, input data based on the instruction;
   reading, from the instruction, the parameter value for the inference task; and
   performing, on the input data and the parameter value embedded in the instruction, the inference task instructed by the instruction.

2. The method of claim 1, wherein the instruction is determined by substituting, with the parameter value, an indicator of the parameter value included in an initial code.

3. The method of claim 2, wherein
   the indicator included in the initial code uses a loop variable index, and
   the loop variable index is converted to an invariable index through loop unrolling.

4. The method of claim 1, wherein the parameter value is a value fixed for the inference task.

5. The method of claim 1, wherein the instruction is determined such that a same parameter value is used in a thread block including a plurality of threads to be processed in the accelerator.

6. The method of claim 5, wherein an operation unit included in the accelerator and having an instruction cache is configured to process the thread block.

7. The method of claim 1, wherein the reading of the instruction from the memory comprises:
   reading, from the memory, a plurality of instructions each including a partial value of the parameter value to be used in the inference task, wherein a maximum length of the partial value of the parameter value included in each of the plurality of instructions is less than a preset threshold value,
   wherein the parameter value is determined based on each of the partial values respectively included in a corresponding one of the plurality of instructions.

8. The method of claim 7, wherein each of the plurality of instructions includes information indicating which part of the parameter value corresponds to the partial value of the parameter value included in the respective instruction.

9. The method of claim 7, wherein
   the plurality of instructions includes a first instruction including a mantissa part of the parameter value and a second instruction including an exponent part of the parameter value, and
   the performing of the inference task comprises performing a multiplication operation on the mantissa part in response to the first instruction being read, and performing an addition operation on the exponent part in response to the second instruction being read.

10. The method of claim 1, wherein
    a maximum length of a parameter value portion of an instruction of the memory is less than a length of the parameter value,
    the memory is configured to store the parameter value as a plurality of parameter value portions, each of the parameter value portions being included in a respective instruction,
    the reading of the instruction from the memory comprises reading the respective instructions, and
    the parameter value is determined based on the parameter value portions.

11. The method of claim 1, wherein the parameter value is a parameter included in a neural network, and further comprising performing any one of speech recognition, machine translation, machine interpretation, object recognition, and pattern recognition based on a result of the performing of the inference task.

12. A non-transitory computer-readable storage medium storing instructions that, when executed by a processor, configure the processor to perform the method of claim 1.

13. An accelerator comprising:
    at least one processing element configured to:
      read, from a memory, an instruction to be executed in an accelerator, the instruction embedding a parameter value of at least some portion of layers in a neural network for an inference task;
      read, from the memory, input data based on the instruction;
      reading, from the instruction, the parameter value for the inference task; and
      perform, on the input data and the parameter value embedded in the instruction, the inference task instructed by the instruction.

14. The accelerator of claim 13, wherein the instruction is determined by substituting, with the parameter value, an indicator of the parameter value included in an initial code.

15. The accelerator of claim 14, wherein
the indicator included in the initial code uses a loop variable index, and
the loop variable index is converted to an invariable index through loop unrolling.

16. The accelerator of claim 13, wherein the parameter value is a value fixed for the inference task.

17. The accelerator of claim 13, wherein the instruction is determined such that a same parameter value is used in a thread block including a plurality of threads to be processed in the accelerator.

18. The accelerator of claim 17, wherein an operation unit included in the accelerator and having an instruction cache is configured to process the thread block.

19. The accelerator of claim 13, wherein, for the reading of the instruction from the memory, the processing unit is configured to:
read, from the memory, a plurality of instructions each including a partial value of the parameter value, wherein a maximum length of the partial value of the parameter value included in each of the plurality of instructions is less than a preset threshold value, wherein the parameter value is determined based on each of the partial values respectively included in a corresponding one of the plurality of instructions.

20. The accelerator of claim 19, wherein each of the plurality of instruction includes information indicating which part of the parameter value corresponds to the partial value included in the respective instruction.

21. An electronic device comprising the memory and the accelerator of claim 13.

22. An electronic device comprising:
a memory configured to store an instruction to be executed in an accelerator and input data; and
the accelerator configured to:
read the instruction from the memory, the instruction embedding a parameter value of at least some portion of layers in a neural network for an inference task;
read the input data from the memory based on the instruction;
read, from the instruction, the parameter value for the inference task; and
perform, on the input data and the parameter value embedded in the instruction, the inference task instructed by the instruction.

* * * * *